Nov. 21, 1950     A. E. HERSHEY ET AL     2,531,127
EXTRUSION NOZZLE FOR INTRAFOLD ICE CREAM

Filed June 6, 1947

INVENTORS,
ABRAM E. HERSHEY &
JOSEPH F. GRISSINGER.
BY

E. E. Vrooman & Co.,
ATTORNEYS.

Patented Nov. 21, 1950

2,531,127

UNITED STATES PATENT OFFICE 2,531,127

EXTRUSION NOZZLE FOR INTRAFOLD ICE CREAM

Abram E. Hershey, Paxtang, and Joseph F. Grissinger, Mechanicsburg, Pa., assignors to Hershey Creamery Company, Harrisburg, Pa., a corporation of Delaware Application June 6, 1947, Serial No. 753,114

2 Claims. (Cl. 107—1)

This invention relates to an improvement in the injection or extrusion of sirup and/or puree, or both, for a semi-solid frozen mass.

An object of the invention is to provide novel and efficient means for facilitating the introduction of sirup and/or puree, or both, preferably in a mass of ice cream, whereby the finished product, or brick, will show a plurality of designs, or patterns, of colored sirup and/or puree.

Another object of the invention is to provide novel and efficient means for introducing a liquid or semi-liquid, such as chocolate or any other flavored sirup, marshmallow, or any fruit or similar puree, in a body of ice cream that comprises portions of different flavors and then discharging the composite mass into a suitable container or package whereupon the filled or loaded package or container is frozen for handling or shipment prior to consumption.

With the foregoing and other objects in view the invention comprises certain novel and efficient constructions, combinations and arrangements as will be hereinafter described, illustrated in the accompanying drawings, and more particularly pointed out in the appended claims.

In the drawings:

Fig. 1 is a top-plan view of a device constructed in accordance with the present invention, while

Figure 1:
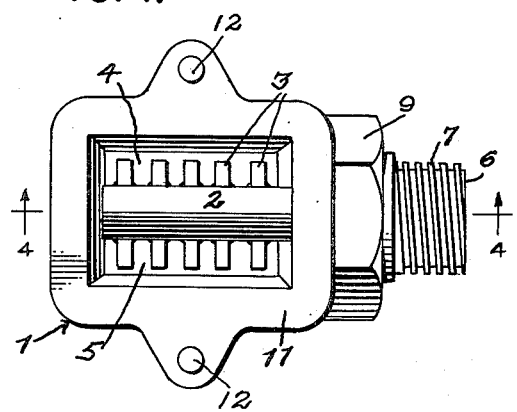
Figure 3:
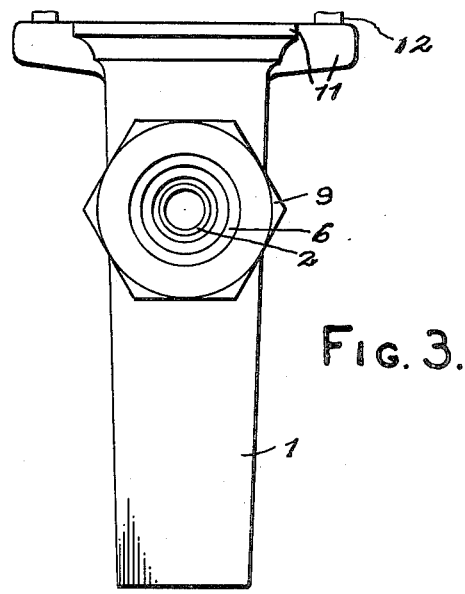
Fig. 3 is a view in elevation of the device taken at right angles to Fig. 2.
Figure 2:
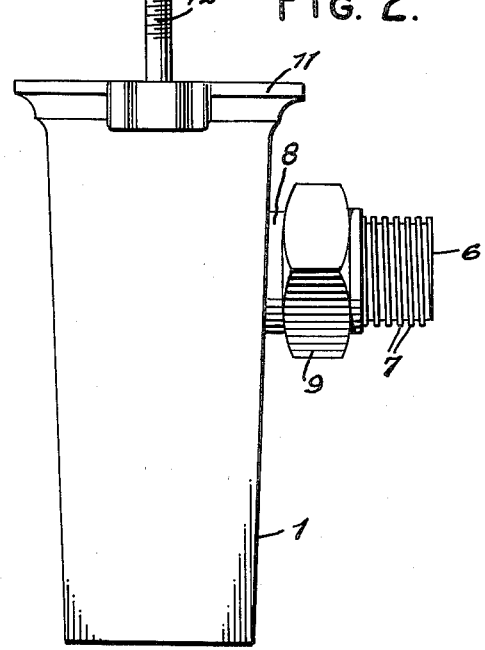
Fig. 2 is a view in side elevation thereof.
Figure 4:
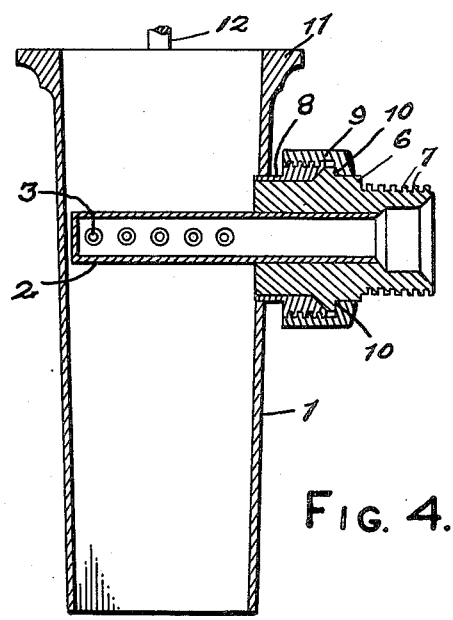
Fig. 4 is a vertical, sectional view taken on line 4—4, Fig. 1, and looking in the direction of the arrows.

Referring to the drawings, in which the preferred embodiment of this invention is illustrated, 1 designates a tapering ice cream extrusion casing, through which by any suitable means ice cream, in a plurality of flavors, and in a semi-solid frozen mass, may be passed or injected into a suitable package or container. A primary cylindrical injector tube 2 extends horizontally only across the tapering casing 1 and is closed at its outer end. The tube 2 is provided with auxiliary, short horizontal tubes 3 (Figs. 1 and 4). The primary tube 2 divides the casing 1 into two ice-cream passages 4 and 5, Fig. 1. The primary tube 2 is supported and partly mounted in the tube-carrying sleeve 6; sleeve 6 is provided on its outer end with threads 7, whereby a suitable connection with a sirup supply is provided. A male threaded ferrule 8 is attached to the casing 1 by the usual means of welding or soldering. A female nut 9 is threaded on ferrule 8, said nut 8 and sleeve 6 being provided with annular ground surfaces 10 for producing a tight fit. Therefore, it will be seen that sleeve 6 carries tube 2, whereby, when nut 9 is removed the tube 2 can easily be removed from its assembled position upon casing 1.

The upper end of casing 1 is provided with a horizontal flange 11 from which projects upwardly preferably two stud bolts 12. These stud bolts 12 are employed for connecting casing 1 to the ice-cream-making machine.

In carrying out the process, the ice cream, which in any case may be of one, two, or three flavors, is introduced at the top of casing 1, and the sirup and/or puree is introduced, under pressure, through the primary elongated injector tube 2. The ice cream is passed through the two ice-cream passages 4 and 5, which are created by the elongated injector tube 2, the sirup and/or puree, under pressure, in tube 2 is forced through the series of nozzles or horizontally positioned tubes 3, into the semi-solid frozen mass of the ice cream passing down through said passages 4 and 5. The sirup and/or puree is thus incorporated into the semi-solid mass of the ice cream in a continuous or unbroken ribbon. As the ice cream, passing downward through casing 1, passes the tube 2, the divided flow of ice cream is forced together again by the tapering construction of the ice cream extrusion casing 1, and the two streams of ice cream, formed by the primary tube 2, become one, and are injected into a suitable container or package, placed under the discharge end of casing 1, whereupon the filled or loaded package or container is further frozen for handling or shipment, prior to consumption.

Figure 5:
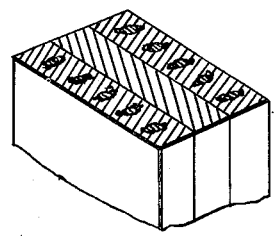
Fig. 5 is partly an isometric and partly a sectional view of the finished product, or ice cream "brick" showing the sirup and/or puree design or pattern created in the product in accordance with the process hereinafter specifically described.

The finished product of this novel method or process for preparing ice cream comprises a substantially frozen mass or brick (Fig. 5) of ice cream in which are inclosed separate and distinct patterns or designs of semi-frozen or liquid sirups and/or purees. The flavor of the individual units of ice cream commingled in the body of each brick is not affected by the injection, under pressure, of the sirup and/or puree; but the pleasure of the consumer is greatly increased by the addition of the sirup and/or puree to the various ice-cream flavors in the mass or brick.

While we have described the preferred embodiment of our invention and illustrated the same in the accompanying drawings, certain minor changes or alterations may appear to one skilled in the art to which this invention relates during the extensive manufacture of the same, and we, therefore, reserve the right to make such changes or alterations as shall fairly fall within the scope of the appended claims.

What we claim is:

1. In a device of the class described, the combination with an open-ended casing, of a horizontal sleeve supported upon the side of said casing, a horizontal, cylindrical injector tube, closed at its outer end and extending horizontally only across said casing, said tube having its inner end extending into and supported by said sleeve, and a series of short, horizontal auxiliary tubes on the side only of said first mentioned tube.

2. In a device of the class described, the combination of an open-ended casing, said casing provided at its top edge with a flange, vertical stud bolts extending from said flange, a horizontal, threaded ferrule fixedly secured at its inner end to the side of said casing, a horizontal tube-carrying sleeve within said threaded ferrule, said tube-carrying sleeve provided with an annular ground surface intermediate its ends, a nut on said tube-carrying sleeve between its ends and bearing against said annular ground surface and threaded onto said threaded ferrule, a primary cylindrical tube, horizontal throughout its length, and closed at its outer end, mounted at its inner end within said tube-carrying sleeve, and a series of short, horizontal, auxiliary tubes extending from the side only of said primary tube.

ABRAM E. HERSHEY.
JOSEPH F. GRISSINGER.

REFERENCES CITED

The following references are of record in the file of this patent:

UNITED STATES PATENTS

| Number | Name | Date |
| --- | --- | --- |
| 1,083,275 | Eberhard | Jan. 6, 1914 |
| 2,249,311 | Johnston et al. | July 15, 1941 |
| 2,313,060 | Friedman | Mar. 9, 1943 |
| 2,344,901 | Routh | Mar. 21, 1944 |
| 2,389,084 | Routh | Nov. 13, 1945 |